(12) United States Patent
Larson

(10) Patent No.: US 9,765,692 B2
(45) Date of Patent: Sep. 19, 2017

(54) SYSTEMS AND METHODS FOR LOAD DIVERSION AROUND LOAD SENSITIVE PARTS

(71) Applicant: United Technologies Corporation, Hartford, CT (US)

(72) Inventor: Christopher J. Larson, Newfield, ME (US)

(73) Assignee: United Technologies Corporation, Hartford, CT (US)

( * ) Notice: Subject to any disclaimer, the term of this patent is extended or adjusted under 35 U.S.C. 154(b) by 261 days.

(21) Appl. No.: 14/601,636

(22) Filed: Jan. 21, 2015

(65) Prior Publication Data

US 2016/0208696 A1 Jul. 21, 2016

(51) Int. Cl.
*F02C 7/06* (2006.01)
*F02C 7/28* (2006.01)
*F01D 25/18* (2006.01)

(52) U.S. Cl.
CPC ............... *F02C 7/06* (2013.01); *F01D 25/183* (2013.01); *F02C 7/28* (2013.01); *F05D 2240/60* (2013.01); *F05D 2240/63* (2013.01); *F05D 2260/98* (2013.01); *F16C 2360/23* (2013.01)

(58) Field of Classification Search
CPC .......... F16C 2360/23; F02C 7/06; F02C 7/36; F05D 2240/60–2240/63; F01D 25/16–25/168; F01D 25/183
See application file for complete search history.

(56) References Cited

U.S. PATENT DOCUMENTS

| | | | | |
|---|---|---|---|---|
| 4,159,888 A | * | 7/1979 | Thompson | F01D 25/18 415/105 |
| 4,329,000 A | * | 5/1982 | Keske | F01D 25/16 384/464 |
| 4,605,101 A | * | 8/1986 | Barbeau | F01D 25/18 184/6.11 |
| 5,160,149 A | * | 11/1992 | Winn | F16J 15/3468 277/362 |
| 5,918,458 A | * | 7/1999 | Coffinberry | F02C 7/185 60/785 |

* cited by examiner

*Primary Examiner* — Pascal M Bui Pho
*Assistant Examiner* — Rene Ford
(74) *Attorney, Agent, or Firm* — Snell & Wilmer L.L.P.

(57) ABSTRACT

In various embodiments, a lubricating shaft assembly may comprise a shaft, a front seal, a front seat, an inner race, a spacer, a lubricating fitting and a nut. The front seat may define a first portion of a fluid conduit. The front seat may be part of a first load path. The inner race may define a second portion of the fluid conduit. The inner race may be installed about the shaft. The inner race may be part of the first load path. The spacer may define an internal diameter of a third portion of the fluid conduit. The lubricating fitting may be installed about at least a portion of the spacer. The lubricating fitting may define an outer diameter of the third portion of the fluid conduit. The lubricating fitting may be outside the first load path.

20 Claims, 4 Drawing Sheets

SYSTEMS AND METHODS FOR LOAD DIVERSION AROUND LOAD SENSITIVE PARTS

FIELD

The present disclosure relates to systems and methods for load distribution and, more particularly, to systems and methods for load diversion around load sensitive parts through alternative load paths.

BACKGROUND

A gas turbine engine may include a shaft with multiple components stacked axially together to form a shaft stack. The shaft stack components may be under relatively high axial loading. Where the stack components include a radial oil scoop, the large openings in the radial oil scoop may cause distortions to the other components in the stack.

SUMMARY

In various embodiments, a lubricating shaft assembly may comprise a shaft, a front seal, a front seat, an inner race, a spacer, a lubricating fitting and a nut. The front seal installed about the shaft. The front seat may define a first portion of a fluid conduit. The front seat installed about the shaft. The front seat may be installed adjacent to the front seal. The front seat may be part of a first load path. The inner race may define a second portion of the fluid conduit. The inner race may be installed about the shaft. The inner race may be installed adjacent to the front seat. The inner race may be part of the first load path. The spacer may define an internal diameter of a third portion of the fluid conduit. The spacer may be installed about the shaft. The spacer may be installed adjacent to the inner race. The lubricating fitting may be installed about at least a portion of the spacer. The lubricating fitting may define an outer diameter of the third portion of the fluid conduit. The lubricating fitting may be outside the first load path and may be in a second load path. The nut may be configured to exert a load along the first load path.

In various embodiments, a gas turbine engine may comprise a fan, a compressor, a combustor, a turbine, a shaft, a front seal, a front seat, a spacer, a lubricating, and a nut. The fan may be configured to create a fan flow. The combustor may be in fluid communication with the compressor. The turbine may be in fluid communication with the combustor. The turbine may be configured to drive the fan. The shaft may be installed through at least a portion of the fan, the compressor, and the turbine. The turbine may be configured to drive the shaft. The shaft may be configured to conduct power form the turbine to at least a portion of the compressor of the fan. A front seal installed about the shaft. The front seat may define a first portion of a fluid conduit. The front seat may be installed about the shaft and adjacent to the front seal. The front seat may be part of a first load path. The spacer may define an internal diameter of a second portion of the fluid conduit. The spacer may be installed about the shaft and aft the front seat. The lubricating fitting may be installed about at least a portion of the spacer. The lubricating fitting may define an outer diameter of the second portion of the fluid conduit. The lubricating fitting may be outside the first load path and being in a second load path. The nut may be configured to exert a load along the first load path and create a second load path.

In various embodiments, a lubricating shaft assembly may comprise a spacer, a lubricating fitting, a wave spring, and a nut. The spacer may define an internal diameter of a first portion of a fluid conduit. The spacer may be installed about a shaft. The lubricating fitting may be installed about at least a portion of the spacer. The lubricating fitting may define an outer diameter of the first portion of the fluid conduit. The lubricating fitting may be outside the first load path and being in a second load path. The wave spring may be installed about the spacer and aft the lubricating fitting. The nut may be configured to define a first load path loaded through the spacer. The nut may also be configured to define a second load path through the wave spring and the lubricating fitting.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
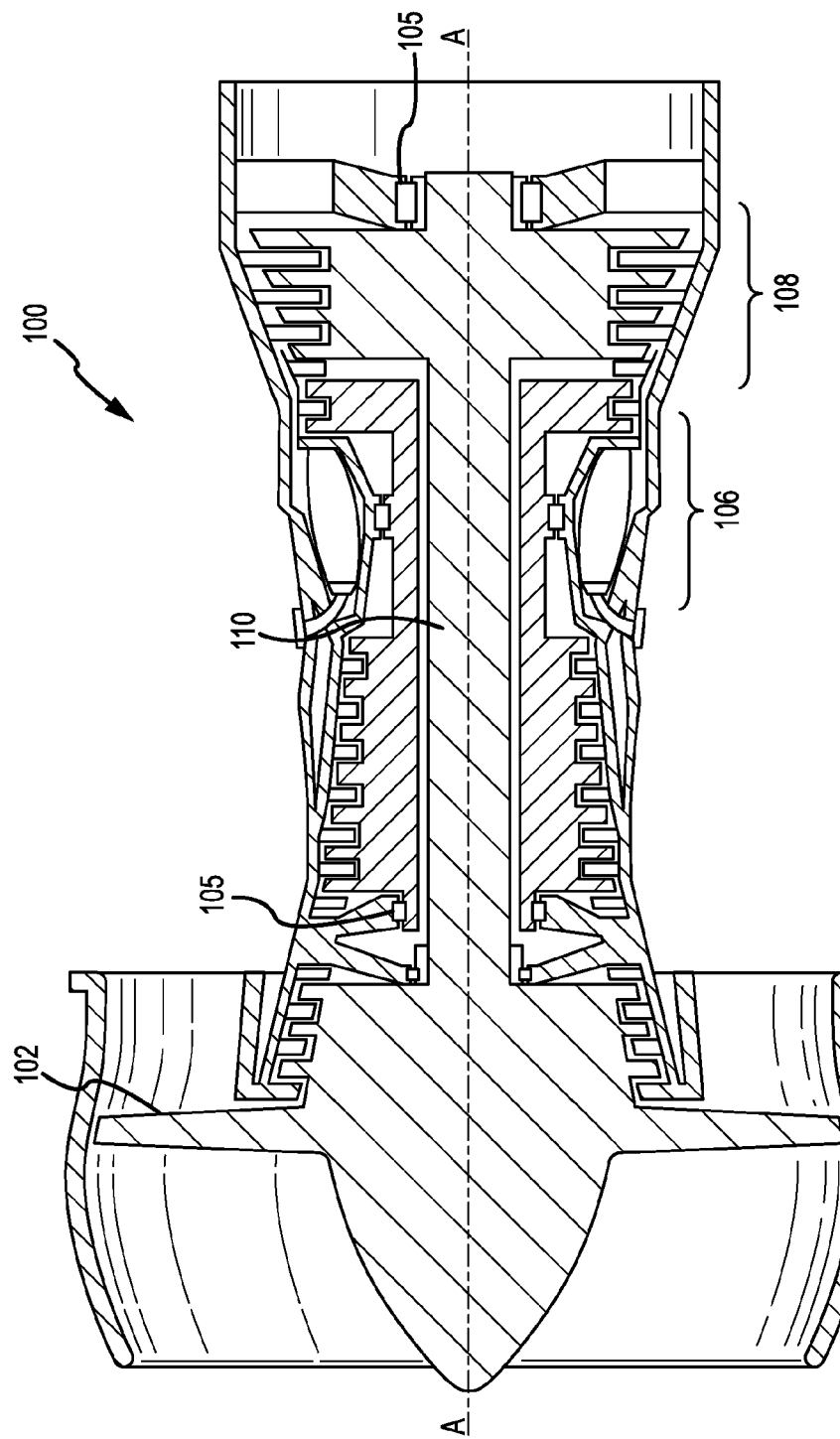
FIG. 1 is a cross-sectional view of an exemplary gas turbine engine in accordance with various embodiments.

In various embodiments and with reference to FIG. 1, a gas turbine engine 100 (such as a turbofan gas turbine engine) is illustrated according to various embodiments. Gas turbine engine 100 is disposed about axial centerline axis A-A, which may also be referred to as axis of rotation A-A. Gas turbine engine 100 may comprise a fan 102, compressor section 104, a combustion section 106, and a turbine section 108. Air compressed in compressor section 104 may be mixed with fuel and burned in combustion section 106 and expanded across turbine section 108. Fan 102, compressor section 104, and turbine section 108 may each contain rotating components that are adjacent to static components. Seals may be used to prevent air flow between rotating and static components.

A plurality of bearings 105 may support spools in the gas turbine engine 100. A main shaft 110 may enclose the axis of rotation A-A in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation A-A. For example, fan 102 may be referred to as forward of turbine section 108 and turbine section 108 may be referred to as aft of fan 102. Typically, during operation of gas turbine engine 100, air flows from forward to aft, for example, from fan 102 to turbine section 108. As air flows from fan 102 to the more aft components of gas turbine engine 100, axis of rotation A-A may also generally define the direction of the air stream flow.

Figure 2A:
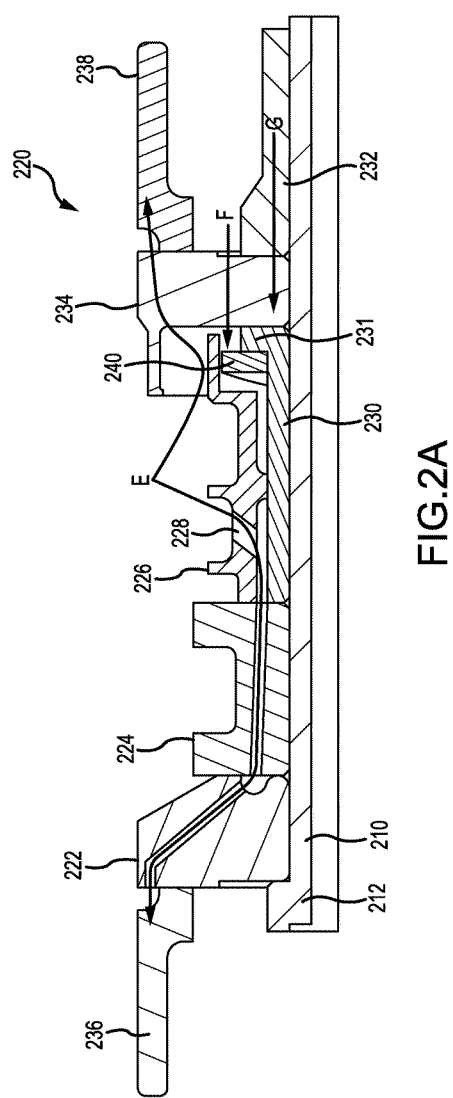
FIG. 2A is a cross-sectional view of shaft stack configuration, in accordance with various embodiments.
Figure 2B:
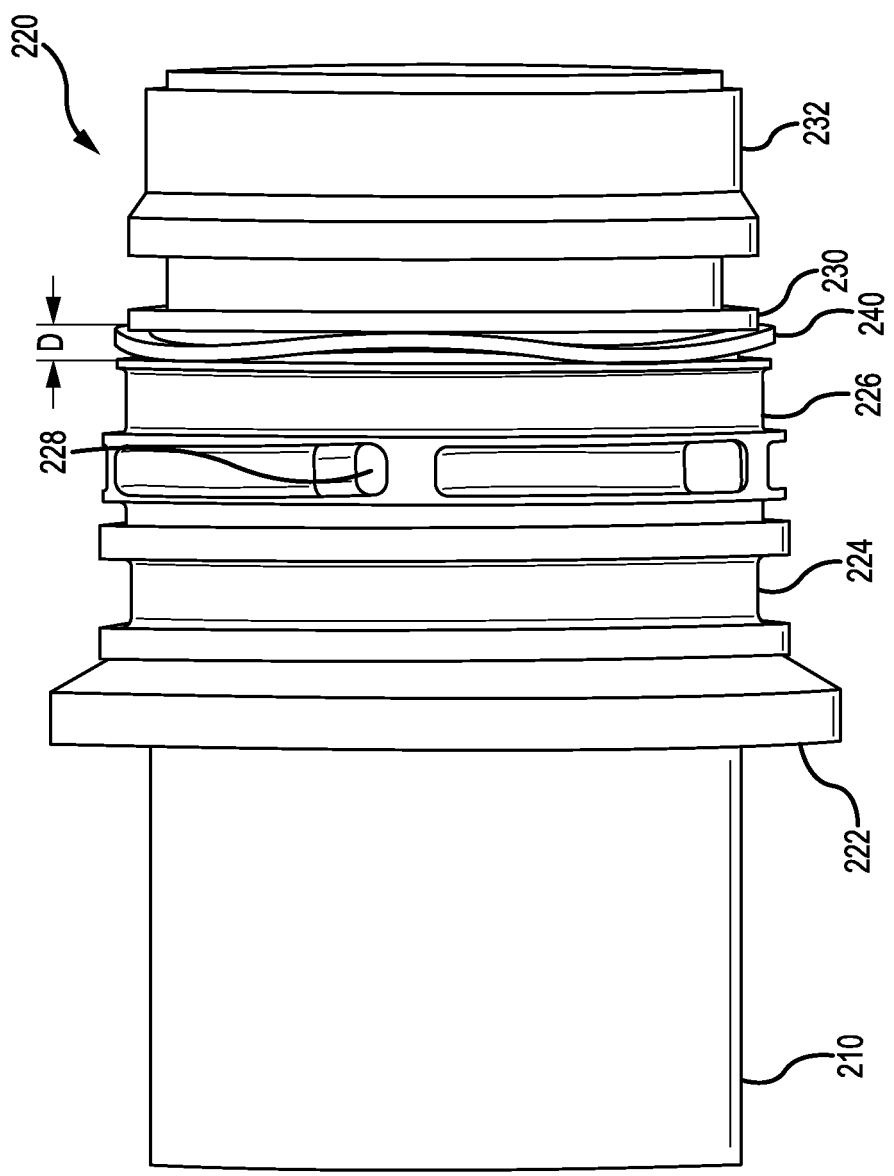
FIG. 2B is an isometric view of shaft stack configuration, in accordance with various embodiments.

In various embodiments and with reference to FIG. 2A and FIG. 2B, a shaft stack 220 (also referred to as a lubricating shaft assembly) may be installable on shaft 210. Shaft stack 220 may be configured to conduct one or more load paths. Shaft stack 220 may also be configured to distribute fluids. In this regard, shaft stack 220 may comprise a fluid flow path E. Fluid flow path E and/or shaft stack 220 may be in fluid communication with a fluid source or fluid reservoir.

In various embodiments, shaft stack 220 may comprise a front seat 222, an inner race 224, a lubrication fitting 226, a spacer 230, a wave spring 240, an aft seat 234 and a nut 232. Shaft stack 220 may also comprise a front seal 236 and an aft seal 238, which are shown in FIG. 2A but are not shown FIG. 2B. Shaft 210 may comprise a shaft lip 212. Shaft stack 220 may be installable on shaft 210. In this regard, shaft stack may be installable about shaft 210 and may be seated on shaft lip 212.

In various embodiments, front seat 222 may be installed about shaft 210 and may seat against shaft lip 212. Inner race 224 may be installed about shaft 210 adjacent to and aft of front seat 222. Spacer 230 may be installed about shaft 210 adjacent to and aft of inner race 224. Lubrication fitting 226 may be installed about shaft 210 on spacer 230. Spacer 230 may comprise a spacer lip 231. Wave spring 240 may be installable between spacer 230 and lubrication fitting 226 in gap D, as shown in FIG. 2B. Wave spring may be retained between lubrication fitting 226 and spacer lip 231 and spacer 230. Aft seat 234 may be installed on shaft 210 adjacent to and aft of spacer 230. Nut 232 may be installed on shaft 210 adjacent to and aft of aft seat 234.

In various embodiments and with specific momentary reference to FIG. 2A, shaft stack 220 may include front seal 236 installed adjacent to and forward of front seat 222. Shaft stack 220 may include aft seal 238 installed adjacent to and aft of aft seat 234. Front seal 236 and aft seal 238 may be configured to seal the forward and aft ends of shaft stack 220. In this regard, front seal 236 and/or aft seal 238 may be configured to seal portions of fluid flow path E. The sealing may prevent leakage of fluid (e.g., cooling fluid, oil, and/or the like) outside the shaft stack 220 and/or fluid flow path E.

In various embodiments and with reference to FIGS. 2A and 2B, nut 232 may be configured to create an axial load G. Axial load G may be conducted along shaft 210 through aft seat, spacer 230, inner race 224, and front seat 222 to shaft lip 212. Axial load G may be configured to load shaft stack 220 to minimize movement of shaft stack 220 and/or the movement between individual components of shaft stack 220. Moreover, shaft stack 220 may be configured to conduct load G around lubrication fitting 226. Nut 232 may also be configured to create an axial load F. Axial load F may be conducted to aft seat 234, spacer 230, wave spring 240 and lubrication fitting 226. Axial load F may be generally less than axial load G. Moreover, axial load F may be configured to load and restrain the movement of lubrication fitting 226, for example axial load F may constrain lubrication fitting 226 from rotation with respect to shaft 210.

In various embodiments, lubrication fitting may comprise one or more ports 228.

The geometry of lubrication fitting 226 and, more specifically, the ports 228 may make lubrication fitting 226 subject to deflection if the load on lubrication fitting 226 exceeded a threshold. For example, axial load G may be sufficiently high to cause lubrication fitting 226 to deflect and/or deform. The deflection and/or deformation of lubrication fitting 226 may also cause other components of shaft stack 220 to deform if lubrication fitting 226 is in the primary load path and subjected to axial load G. To avoid damage lubrication fitting 226 and/or other components of shaft stack 220, lubrication fitting 226 is removed from the primary load path.

In various embodiments, lubrication fitting may be loaded in a secondary load path by axial load F. The secondary load path may originate at nut 232 and be conducted through wave spring 240. When loaded by axial load F, wave spring 240 may be compressed and gap D may be reduced and/or closed. Wave spring 240 may further translate axial load F to lubrication fitting 226. Axial load F may be designed to load lubrication fitting 226 with sufficient force to restrain lubrication fitting 226 but not significantly deform lubrication fitting 226.

Figure 3:
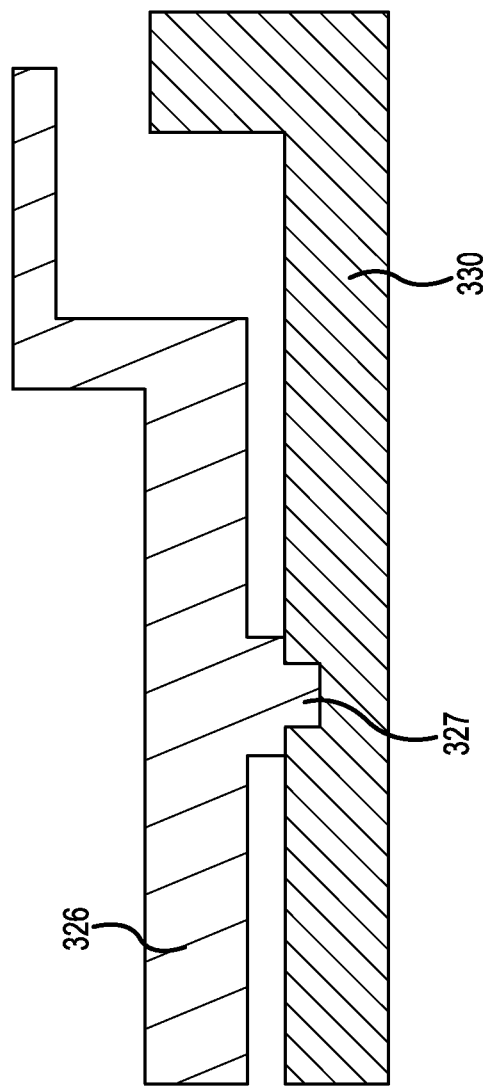
FIG. 3 is a cross-sectional view of an anti-rotating feature, in accordance with various embodiments.

In various embodiments and with reference to FIG. 3, lubrication fitting 326 may include a retaining feature 327 (e.g., a tab or boss). Retaining feature 327 may be installable in a channel, hole, of slot defined in spacer 330. In this regard, lubrication fitting 326 may be restrained by retaining feature 327 and an axial load (e.g., axial load F, as shown in FIG. 2A).

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will he apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lubricating shaft assembly, comprising:
   a shaft;
   a front seal installed about the shaft;
   a front seat defining a first portion of a fluid conduit, the front seat installed about the shaft and adjacent to the front seal, the front seat being part of a first load path;
   an inner race defining a second portion of the fluid conduit, the inner race installed about the shaft and adjacent to the front seat, the inner race being part of the first load path;
   a spacer defining an internal diameter of a third portion of the fluid conduit, the spacer installed about the shaft and adjacent to the inner race;
   a lubrication fitting installed about the shaft with direct contact with at least a portion of the spacer and defining an outer diameter of the third portion of the fluid conduit, the lubrication fitting being outside the first load path and being in a second load path; and
   a nut configured to exert a load along the first load path.

2. The lubricating shaft assembly of claim 1, further comprising a wave spring installed adjacent an aft end of the lubrication fitting.

3. The lubricating shaft assembly of claim 2, the wave spring configured to originate the second load path through the lubrication fitting.

4. The lubricating shaft assembly of claim 3, wherein the wave spring is located within a void between the lubrication fitting and an aft seat.

5. The lubricating shaft assembly of claim 4, further comprising the aft seat installed about the shaft and adjacent the lubrication fitting and the spacer.

6. The lubricating shaft assembly of claim 5, wherein the first load path is conducted by the aft seat from the nut to the spacer and the wave spring.

7. The lubricating shaft assembly of claim 6, wherein the second load path is defined by the aft seat loading the wave spring.

8. The lubricating shaft assembly of claim 3, wherein a first load associated with the fist load path is greater than a second load associated with the second load path.

9. The lubricating shaft assembly of claim 1, wherein the fluid conduit is configured to be in fluid communication with a fluid source.

10. The lubricating shaft assembly of claim 1, wherein the shaft comprises a lip that is configured to bear the load conducted through the first load path parallel to a centerline of the shaft.

11. The lubricating shaft assembly of claim 1, wherein the lubrication fitting comprises a plurality of ports configured to receive and conduct fluid to the fluid conduit.

12. The lubricating shaft assembly of claim 11, wherein the plurality of ports are outside the first load path.

13. A gas turbine engine, comprising:
    a fan configured to create a fan flow;
    a compressor;
    a combustor in fluid communication with the compressor;
    a turbine in fluid communication with the combustor, the turbine configured to drive the fan;
    a shaft installed through at least a portion of the fan, the compressor, and the turbine, wherein the turbine is configured to drive the shaft, wherein the shaft is configured to conduct power form the turbine to at least a portion of the compressor or the fan;
    a front seal installed about the shaft;
    a front seat defining a first portion of a fluid conduit, the front seat installed about the shaft and adjacent to the front seal, the front seat being part of a first load path;
    a spacer defining an internal diameter of a second portion of the fluid conduit, the spacer installed about the shaft and aft the front seat;
    a lubrication fitting installed about the shaft with direct contact with at least a portion of the spacer and defining an outer diameter of the second portion of the fluid conduit, the lubrication fitting being outside the first load path and being in a second load path; and
    a nut configured to exert a load along the first load path and create a second load path.

14. The gas turbine engine of claim 13, further comprising a wave spring installed between the lubrication fitting and the nut outside the first load path and in the second load path.

15. The gas turbine engine of claim 14, wherein the wave spring is located within a void between the lubrication fitting and an aft seat.

16. The gas turbine engine of claim 13, wherein the lubrication fitting comprises a plurality of ports configured to receive and conduct fluid to the fluid conduit.

17. The gas turbine engine of claim 13, wherein the fluid conduit is configured to be in fluid communication with a fluid source.

18. A lubricating shaft assembly, comprising:
    a spacer defining an internal diameter of a first portion of a fluid conduit, the spacer installed about a shaft;

a lubrication fitting installed about the shaft with direct contact with at least a portion of the spacer and defining an outer diameter of the first portion of the fluid conduit, the lubrication fitting being outside a first load path and being in a second load path;

a wave spring installed about the spacer and aft the lubrication fitting; and a nut configured to define the first load path loaded through the spacer and a second load path through the wave spring and the lubrication fitting.

19. The lubricating shaft assembly of claim 18, wherein the fluid conduit is configured to be in fluid communication with a fluid source.

20. The lubricating shaft assembly of claim 18, wherein the lubrication fitting comprises a plurality of ports configured to receive and conduct fluid to the fluid conduit.

* * * * *